United States Patent
Sithamparanathan et al.

(10) Patent No.: US 12,086,674 B2
(45) Date of Patent: Sep. 10, 2024

(54) SYSTEMS AND METHODS FOR READING RFID TAGS

(71) Applicant: PervasID Limited, Cambridge (GB)

(72) Inventors: Sabesan Sithamparanathan, Middlesex (GB); Ian White, Somerset (GB); Michael Crisp, Cambridgeshire (GB); Richard Vincent Penty, Cambridgeshire (GB); Martin Neuhaus, Cambridgeshire (GB)

(73) Assignee: PERVASID LIMITED, Cambridge (GB)

( * ) Notice: Subject to any disclaimer, the term of this patent is extended or adjusted under 35 U.S.C. 154(b) by 311 days.

(21) Appl. No.: 17/527,139

(22) Filed: Nov. 15, 2021

(65) Prior Publication Data

US 2022/0075968 A1 Mar. 10, 2022

Related U.S. Application Data

(63) Continuation-in-part of application No. 17/298,455, filed as application No. PCT/GB2019/053387 on Nov. 29, 2019.

(30) Foreign Application Priority Data

Nov. 30, 2018 (GB) ...................................... 1819591

(51) Int. Cl.
*G06K 7/10* (2006.01)
(52) U.S. Cl.
CPC ..... *G06K 7/10356* (2013.01); *G06K 7/10089* (2013.01); *G06K 7/10297* (2013.01)
(58) Field of Classification Search
CPC ........... G06K 7/10089; G06K 7/10356; G06K 7/10297
See application file for complete search history.

(56) References Cited

U.S. PATENT DOCUMENTS 9,129,200 B2 * 9/2015 Lavedas ............... H01Q 1/2225
10,025,960 B1 * 7/2018 Fink ........................ H04L 5/08
(Continued)

FOREIGN PATENT DOCUMENTS

EP 1544781 A2 6/2005

OTHER PUBLICATIONS

Extended European Search Report (EESR) for corresponding EP Application No. 23179876, dated Sep. 25, 2023, pp. 1-7.
(Continued)

*Primary Examiner* — Yong Hang Jiang
(74) *Attorney, Agent, or Firm* — Tarolli, Sundheim, Covell & Tummino LLP

(57) ABSTRACT

An RFID system comprises an array of antennas each configured to emit a plurality of beams in different directions. The beams of each pair of adjacent antennas are directed towards one another and overlap. A pair of adjacent antennas transmits simultaneously and the overlapping beams interfere to create an interference pattern. An RFID reader controls the relative phase and/or frequency of the beams to move the interference pattern to read an RFID tag within the moving pattern. As the chance of a RFID tag responding to an emitted beam generally increases with signal strength of the reader beam an area of constructive interference means that RFID tags in that region are more likely to respond to the signal. The system can cover a large proportion of the area below ceiling-mounted antennas, where cover generally means that RFID tags in that area will be successfully read.

20 Claims, 13 Drawing Sheets

(56) References Cited

U.S. PATENT DOCUMENTS

| | | |
|---|---|---|
| 10,476,155 B2 | 11/2019 | Desclos et al. |
| 2007/0057789 A1 | 3/2007 | Hamerly |
| 2007/0194931 A1* | 8/2007 | Miller .................. G01S 13/878 340/572.7 |
| 2007/0205953 A1 | 9/2007 | Bombay |
| 2007/0210923 A1* | 9/2007 | Butler ................ G06K 19/0724 340/572.7 |
| 2007/0290860 A1 | 12/2007 | Lucas |
| 2008/0150691 A1 | 6/2008 | Knadle et al. |
| 2010/0039231 A1 | 2/2010 | Fuchs et al. |
| 2010/0141392 A1* | 6/2010 | Jo ...................... G06K 7/10039 340/10.2 |
| 2011/0130085 A1 | 6/2011 | Bellows et al. |
| 2013/0147609 A1* | 6/2013 | Griffin ............... G06K 7/10356 340/10.5 |
| 2013/0201003 A1 | 8/2013 | Sabesan et al. |
| 2015/0002273 A1 | 1/2015 | Bremer et al. |
| 2017/0286903 A1 | 10/2017 | Elizondo, II |
| 2018/0165482 A1* | 6/2018 | Springer ............ G06K 7/10366 |
| 2019/0108373 A1* | 4/2019 | Ito ...................... G06K 17/0022 |

OTHER PUBLICATIONS

U.S. Final Office Action for U.S. Appl. No. 17/298,455, issued Dec. 15, 2023. pp. 1-12.
British Search and Examination Report for Application No. GB1819591.7 dated May 22, 2019.
British Examination Report for Application No. GB1819591.7 dated Feb. 8, 2021.

* cited by examiner

Wide area array

N - beams
N = 3:

Beams of central element

Wide area array

SYSTEMS AND METHODS FOR READING RFID TAGS

FIELD

This invention generally relates to reading passive radio frequency identification (RFID) tags, and in some implementations to a system comprising an array of antennas and one or more RFID readers.

BACKGROUND

The use of RFID methods for the identification of goods in both retail and industrial environments is well known. Each item of inventory is provided with a passive RFID tag. RFID readers, whose function is to register the tags and read associated information such as item description, are positioned to cover the area of interest. In environments having a very dense population of passive tags, for example large retail stores and industrial warehouses where tag densities may exceed 250 tags per square metre of floor area, current reader systems are able to register a typical maximum of 85% of the tags present in the area of interest. This represents a significant restriction to the usefulness of the system because a significant proportion of inventory is not registered.

Failure to register tags that are in the area intended to be covered by readers has two major causes: the failure of the reader antennas to illuminate the whole target area and interference to the process of reading the returns from scanned tags caused by collisions between tag responses or interference by further transmissions from other readers covering the same area.

We have previously described systems for reading passive radio frequency identification (RFID) tags in WO2011/135328 and WO2011/135329. Further background prior art can be found in US2010/0039231; US2013/0147609; and EP1544781A. However, there remains a need for improved techniques.

SUMMARY

The invention is defined in the claims. It is noted that any reference to 'suppression' within the present specification may for example relate to jamming. Thus, to describe an embodiment, any reference to e.g. 'suppress' or 'suppressing' herein may be replaced by the term 'jam' or 'jamming'.

According to a first aspect there is provided an RFID system for reading at least one RFID tag. The system may comprise an array of antennas, each antenna configured to emit a plurality of beams in different directions. The beams of each pair of adjacent antennas may be directed towards one another so that the beams overlap. The arrays may be ceiling-mounted. At least one RFID reader may be connected to at least two of the antennas such that at least one pair of adjacent antennas transmits simultaneously such that the overlapping beams interfere with one another to create an interference pattern. The at least one RFID reader may be configured to control at least one of the phase and the frequency of one of the interfering beams with respect to the other to move the interference pattern to read one or more RFID tags within the moving interference pattern.

Advantageously, the beams overlap at points in time to create a region of constructive interference. As the chance of a RFID tag responding to an emitted beam generally increases with signal strength of the emitted (reader) beam, the area of constructive interference means that RFID tags in that region are more likely to respond to the signal. The direction and phase of the beams can be controlled to direct regions of interferences toward an area containing RFID tags to be read. Therefore, embodiments can provide a system that can cover a large proportion of the area below the antennas, where cover generally means that RFID tags in that area will be successfully read.

In some prior art, interference between two readers (which may also function as transmitters) is avoided in all regions, however, implementations of the described system are configured to intentionally create regions of controlled interference between neighbouring antennas. In embodiments, the layout and geometry of the antennas of the array is such that these regions of controlled interference form a substantially continuous region of coverage.

In a preferred embodiment, each antenna is configured to emit n beams in n different radial directions. The array may be defined by nodes at which the antennas are located.

The different directions may correspond to lines between nodes of the array. Advantageously, this allows for different arrangements of antennas. Different implementations may have antennas emitting a different number of beams. For example, an arrangement where n=6 may result in a triangular grid, and an arrangement where n=3 may result in a hexagonal grid. The arrangement and geometry can be tailored, for example, to specific requirements of the desired coverage area, and/or to the shape, size and type of RFID tags likely to be within the area.

In some implementations each antenna comprises a set of antenna elements, and wherein the antenna has a corresponding set of connections, one for each beam direction, wherein the direction of a beam is dependent upon at least one of: a spacing between two antenna elements of said antenna an electronic configuration of said antenna; a shape of said antenna elements. The connections may be transmitting and/or receiving connections.

Advantageously, this allows for arrangements where the antennas are configured to optimally cover the area being targeted. Systems employing a single antenna emitting multiple beams facilitate providing coverage in multiple directions from the antenna and thus can minimize areas where there is low coverage.

Furthermore, by having each connection drive a beam in a given direction each beam direction can be adjusted independently rather than controlling all of the multiple beams emitted from an antenna in the same manner. Advantageously the approach further allows the possibility of having one port that is transmitting whilst another port receives a signal. Thus in implementations it is possible to transmit signals into one area of coverage and to receive signals from RFID tags in another direction.

Advantageously, implementations of the described system can also have multiple beams emitted at a given (simultaneous) time from a single antenna, rather than a reader triggering the beams to be emitted at separate times. This facilitates continuous coverage of an area associated with a given antenna.

In some implementations of the system the array of antennas defines multiple groups of antennas, where each group of antennas has an associated RFID reader, and where the RFID readers of the different groups operate at different frequencies. Adjacent groups may have at least one shared antenna and the system may be configured to control the RFID readers such that the shared antenna emits beams of two different frequencies in two different respective directions, one for each group.

In some implementations of the system the array of antennas extends over a region defining a pattern in which each group has a set of boundary antennas and a central antenna. Beams of the central antenna may be directed towards each boundary antenna; the boundary antennas may be shared between the groups.

Providing different groups of antennas operating at different frequencies helps to minimise unintentional interference between different groups of antennas. Although within a group there are regions of intentional interference, it may be disadvantageous to have inference between/across groups. Generally, the beams emitted from an antenna will point into and/or towards the group with which the beam is associated. Thus, in embodiments, each group may provide substantially continuous coverage within the group and minimal coverage outside of the group, minimising the effect of interference across groups. Furthermore, because multiple beams associated with multiple groups may be emitted from a single antenna the region of coverage generally covered by a group may border the coverage of the adjacent group. Therefore, by providing a system with multiple groups comprising antennas associated with multiple groups it is possible to have large continuous areas of coverage.

In embodiments, providing an antenna associated with different groups facilitates the groups to be more closely spaced together than if separate antennas were used for separate groups.

In some implementations of the system the RFID readers may be synchronized in frequency and/or transmit timing. For example in a wide area system there is a possibility that adjacent readers, even when on different frequencies, will cause reader-reader interference at the tag owing to the lack of frequency selectivity in low cost passive tags. Such interference may result in tags not being able to correctly demodulate reader commands. Synchronising the reader signal (modulation, and optionally protocol) across multiple readers e.g. such that they send substantially identical signals can suppress this problem. This can be achieved with synchronisation at the relatively low reader modulation rate, which is typically 100's kHz to 1 MHz.

Frequency synchronization may be used to inhibit adjacent readers from operating on the same frequency, which can cause interference at the reader's receiver from the adjacent reader transmitter if the modulation and protocol are not synchronised. This can arise from the signal (modulation) from one reader corrupting tag signals from another reader. Where the reader modulation and protocol are synchronised, it can be desirable to control the operating frequencies of adjacent readers such that their frequencies are well enough separated that the beat (difference) frequency is different, e.g. substantially different, from the modulation frequency.

In some implementations of the system the antennas are configured to be ceiling mounted. Each antenna may be configured to emit the plurality of beams in different lateral directions, each directed at an angle away from a plane defined by the array of antennas.

Advantageously, the lateral direction may provide overlapping regions of coverage with other antennas. The beams being directed away from the plane has an advantage that when the antennas are ceiling mounted the beam travels downwards in the direction of RFID tags positioned under the ceiling.

In some implementations of the system the RFID reader is configured to dither a relative phase of the overlapping beams.

The dithering of the relative phase can facilitate the creation of regions of constructive interference.

In some implementations of the system the RFID reader is configured to control a first antenna of the array to emit a first beam and a second beam. The first and second beams may differ in either time or frequency. The first beam may generates a first overlapping region with a beam emitted from a second antenna of the array and the second beam may generates a second overlapping region with a beam emitted from the second antenna. The first overlapping region may be on a first side of a dividing line joining the two antennas and the second overlapping region may be on a second side of the dividing line. This facilitates monitoring of a portal such as a door through which the RFID tags may pass.

In some implementations of the system the RFID system is further configured to count, for an identified tag, a number of tag reads or read rate on the first side of the line and on the second side of the line, and to determine, from a difference between the number of tag reads or read rate on each side of the line, probable movement of the identified tag towards, away or across the dividing line.

Transmission of the first and second beams may occur at different (non-overlapping) times; for example emission of the beams may alternate. This facilitates the system determining which beam emission triggered a given RFID tag to respond. Additionally or alternatively this advantage may also be provided by emitting beams of different frequencies. Creating overlapping regions of the beams advantageously provides for stronger signal coverage. Furthermore, two narrow overlapping beams can define a narrower area of coverage than a single beam of the same area. This may be used to more accurately determine the location of an RFID tag than may be possible with a single beam.

Embodiments could be installed over a doorway, which can define a boundary to be crossed. Embodiments can probabilistically determine whether an RFID tag is on one side of the doorway or another, and if the tag has moved from one side to another.

In some implementations of the system two or more antennas of the array of antennas define a dividing line. The RFID system may be configured to drive the antennas so that opposite sides of the dividing line are either i) alternately illuminated by the interfering beams or ii) illuminated by interfering beams of different frequencies. The RFID system may be configured to determine movement of a tag across the dividing line from respectively either i) a difference in read rate of the tag during the times of alternate illumination or ii) a difference in read rate of the tag at the different frequencies, as the tag moves from one side of the dividing line to the other.

According to a further aspect there is provided a method of reading at least one RFID tag. The method may comprise emitting from each antenna of an array of antennas a plurality of beams in different directions; the beams of each pair of adjacent antennas may be directed towards one another so that the beams overlap. The method may further comprise transmitting from at least one pair of adjacent antennas simultaneously such that the overlapping beams interfere with one another to create an interference pattern. The method may further comprise controlling at least one of the phase and the frequency of one of the interfering beams with respect to the other to move the interference pattern to read one or more RFID tags within the moving interference pattern.

In another aspect there is provided an RFID or radio system for reading one or more RFID tags or radio sensors. The system may comprise an antenna comprising an array of antenna elements. The system may further comprise a feed network configured to produce multiple discrete beams from the antenna elements, having multiple ports. Each port may be configured to produce a beam. The system may further comprise one or more RFID reader units or radio systems, each e.g. connected to a port of said feed network. The one or more RFID reader units or radio systems may be operated such that each beam of the antenna is simultaneously modulated with substantially different signals and/or has a different carrier frequency.

Some implementations of the above described, and other, RFID systems and methods may restrict the area of coverage of a particular antenna by transmitting a suppressing signal from one or more other antennas such that the tags within the suppressing area are unable to respond to the reader e.g. with an identifier such as an EPC (Electronic Product Code), even if sufficient field strength exists to activate the tag. For example, suppressing signals and RFID tag interrogation signals are both transmitted from antennas having, for example, different locations, beam shapes and/or orientations. In areas where the interrogation signal is stronger by a predetermined amount than the suppressing signal, RFID tags in that area can be successfully read. In contrast, in areas where the suppressing signal is stronger than the interrogation signal, it prevents RFID tags from being read.

This can be advantageous where it is desired to create a sharp boundary between areas where tags are and are not read.

Thus there is also provided an RFID system or method as described above further comprising (use of) a system to transmit a suppressing signal towards an area of tag-reading coverage of one or more of the antennas to define a boundary of the area of tag-reading coverage.

Thus there is also provided a method of reading at least one RFID tag, the method comprising: emitting a reading signal from at least one antenna, emitting a suppressing signal from at least one (other) antenna, wherein the beams of the reading and suppressing signals overlap to an extent to cause a sharp boundary between where tags are and are not able to be read. Here one or more of the antennas may be part of an antenna array.

Suppressing can be achieved e.g. using a carrier modulated with frequency band limited noise or a pseudo random modulated signal similar to the reader to tag communication, or can be achieved by using signals which are compliant with the protocol, but purposefully inserting errors into acknowledgement packets. Due to the lack of frequency selectivity in RFID tags, suppressing may occur on the same frequency as the RFID interrogator, or another channel within the band.

Thus in another aspect there is provided a method of reading at least one RFID tag, the method comprising: emitting a reading signal from at least one antenna, and emitting a suppressing signal from at least one (other) antenna, wherein the beams of the reading and suppressing signals overlap to an extent to cause a sharp boundary between where tags are and are not able to be read.

There is also provided an RFID system for reading at least one RFID tag, the system comprising: an RFID reader coupled to a first antenna for reading an RFID tag; and an RFID signal suppressor coupled to a second antenna and configured to suppress the RFID reader from reading the RFID tag.

The RFID signal suppressor coupled to the second antenna may be configured to suppress the RFID reader from reading the RFID tag when the RFID tag is beyond a tag reading boundary of the RFID reader, e.g. by directing the second antenna and/or adjusting a strength of the suppressing signal.

The suppressing may comprise transmitting noise and/or may comprise transmitting a signal according to a protocol of the RFID tag which includes an error check, wherein the suppressing signal comprises data which is configured to fail the error check.

It is envisaged that alternatively or in addition to the above described suppressing signal, other signals that disrupt the RFID reader and prevent the RFID from reading the RFID tag may also be used.

Thus, in another aspect, there is provided an RFID system for reading at least one RFID tag, the system comprising: an RFID reader coupled to a first antenna for reading an RFID tag; and an RFID communication disruptor coupled to a second antenna and configured to disrupt a communication signal that is according to an RFID protocol, the communication signal being for communication from the RFID reader to the RFID tag or from the RFID tag to the RFID reader, by transmitting an interference signal to prevent the RFID reader from reading the RFID tag.

In some implementations, the RFID communication disruptor is configured to interfere with the communication signal when the RFID tag is beyond a tag reading boundary of the RFID reader. It is envisaged that this may be, for example, a boundary in a space such as a retail or other premises, warehouse or similar. Advantageously and in a similar manner to the suppressor described above, the RFID communication disruptor of an embodiment allows a sharp boundary to be established, improving the accuracy of the RFID system.

In some implementations, the interference signal comprises a corrupted communication signal that is otherwise according to the RFID protocol. For example, the same underlying signal according to the protocol may be used for the communication signal and for the corrupted signal (for example, by generating a communication signal according to the protocol, splitting the signal into two paths, and corrupting the signal in one path to generate the corrupted signal). One way to corrupt the signal is to switch on and off rapidly the signal as it is being transmitted such that only part of the signal is transmitted. Thus, in some implementations, the corrupted communication signal comprises a partial communication signal according to the RFID protocol. Additionally or alternatively, a phase shift may be added to the corrupted signal before it is transmitted to corrupt it.

Using a corrupted communication signal that is otherwise according to the RFID protocol is particularly advantageous as it allows the same hardware setup to be used for both reading and disrupting modes thus simplifying installation requirements of the system.

For example, one antenna may be in a reading mode and be transmitting a communication signal according to the protocol. In order to switch it into a disrupting mode, an RFID communication disruptor also coupled to the antenna need only introduce corruption into the communication signal for the antenna to transmit the interference signal. When the system comprises an array of antennas coupled to one or more RFID readers and RFID communication disruptors, the system advantageously becomes highly customizable to establish zones of communication signal disruption and zones of tag reading with sharp boundaries.

In some implementations, the interference signal comprises random or white noise. For example, if the communication signal is pulse interval encoded, the interval on a single pulse may be filled in with noise. It is envisaged this may also be done for every pulse to maximize the chance that disruption is successful.

In some implementations, the RFID system is configured to generate the communication signal by amplitude and/or phase modulation of a message, and configured to amplitude and/or phase modulate the interference signal such that each of the one or more bits of the message as detected is erroneously detected relative to the bit as transmitted. For example, the reader to tag data may be pulse interval encoded and the tag to reader data may be FM0 or Manchester encoded (or the other way round) whereby detecting a bit erroneously may mean detecting a 0 when a 1 was transmitted or a 1 when a 0 was transmitted. Thus the received bit is flipped relative to the transmitted bit. Optionally, in some implementations, said amplitude and/or phase modulation is relative to the communication signal. For example, when the interference signal is a corrupted communication that is otherwise according to the RFID protocol and generated using the same underlying signal as the communication signal itself, the modulation of the interference signal may be done relative to the communication signal. Advantageously, changes to the amplitude or phase of the interference signal may be made to coincide with when the amplitude of the communication signal is zero to generate less out-of-band interference.

Communications in both directions may be disrupted. That is, communications from the RFID reader to the RFID tag may be disrupted and/or communications from the RFID tag to the RFID may be disrupted. Advantageously, by doing both, the chance of successfully disrupting the communication is increased.

Thus, in some implementations, the communication signal comprises a communication signal from the RFID reader to the RFID tag, the RFID tag configured as a bit detector to read a message in the communication signal.

In some implementations, the message comprises an encoded query or acknowledgement message from the RFID reader to the RFID tag according to the RFID protocol.

In some implementations, the query message comprises a query command, according to the RFID protocol, and the acknowledgement message comprises a random 16-bit handle received by the RFID reader from the RFID tag, said random 16-bit handle generated by the RFID tag responsive to the query command.

In some implementations, the communication signal comprises a communication signal from the RFID tag to the RFID reader, the RFID reader configured as a bit detector to read a message in the communication signal.

In some implementations, the message comprises an encoded random 16-bit handle generated by the RFID tag according to the RFID protocol in response to a query message from the RFID reader.

In some implementations, the communication signal and interference signal interfere at the detector, the interference signal causes erroneous detection of one or more bits of the communication signal as detected relative to the bit as transmitted.

In some implementations, the message is encoded in the communication signal using an amplitude and/or phase modulation scheme, and the RFID communication disruptor is configured to dither a phase of the interference signal to cause said erroneous detection of the one or more bits of the message as detected at the detector. Optionally, in some implementations said dithering is relative to the communication signal.

In some implementations, a frequency of the dithering is faster than a bit rate of the amplitude and/or phase modulation scheme to thereby apply and remove a phase shift to the interference signal within a single bit period of the scheme. Although it may be slower, as long as at least one bit in the message is erroneously detected at the reader. It is envisaged that this rate may be less than a rate which would result in the dithering being filtered out as noise by the system. For example, the frequency may be at or around the backscatter link frequency of the RFID system.

In some implementations, the RFID system is configured to perform communication using the RFID protocol which includes an error check, and configured such that said erroneous detection of the one or more bits of the communication signal causes the message to fail the error check.

In some implementations, the RFID protocol comprises a EPCglobal Class 1 Generation 2 (ISO 18000-6C) protocol. In this standard, the random 16-bit handle is a 16-bit pseudorandom number. The tag transmits this number to the RFID reader and the reader transmits it back as an acknowledgement. The above described error check may comprise said transmitting the random 16-bit handle back to the tag which checks to see if the returned number matches the originally transmitted number.

In some implementations, the detector has an amplitude demodulator comprising an envelope detector circuit configured to vary a threshold amplitude based on a rolling average amplitude of an input signal and to perform envelope detection by detecting peaks of the input signal that are above the threshold amplitude, and the RFID communication disruptor is configured to intermittently transmit the interference signal to alter the signal level at the input of the envelope detector to thereby cause the threshold to vary to prevent the envelope detector from correctly demodulating the communication signal.

In some implementations, the RFID communication disruptor comprises an interference transmitter to transmit the interference signal, the interference transmitter comprising a power amplifier to amplify a drive signal driving the interference transmitter, wherein the RFID communication disruptor is configured to switch the power amplifier on and off to cause said intermittent transmitting of the interference signal.

In some implementations, when the communication signal and interference signal interfere at the RFID reader, the interference signal causes one or more bits of the encoded random 16-bit handle as detected to be erroneously detected, thereby causing the RFID system to send an acknowledgement message comprising an invalid random 16-bit handle.

In some implementations, the RFID reader comprises a plurality of detection channels, each channel associated with a direction relative to the first antenna, and wherein the RFID communication disruptor comprises a noise generator configured to generate noise in one or more of the detection channels to reduce a signal to noise ratio of the communication signal detected in the one or more detection channels. The noise may be, for example, random or white noise.

In some implementations, the RFID reader is configured to transmit the communication signal in a first polarization, and wherein the RFID communication disruptor is configured to transmit the interference signal in a second, different polarization. For example, the first polarization may be one of left or right handed circular polarization, and wherein the second polarization is the other of left or right handed circular polarization. Advantageously, this allows the two signals to be distinguished from each other.

In some implementations, the RFID reader is configured to transmit the communication signal having a first carrier wave frequency, and wherein the RFID communication disruptor is configured to transmit the interference signal having a second, different carrier wave frequency. Advantageously, this allows the two signals to be distinguished from each other.

In some implementations, the RFID system is configured to determine a received signal strength indicator (RSSI) of the communication signal, and, when the RSSI is below a predetermined threshold, to determine that the RFID tag is beyond the tag reading boundary.

In some implementations, the first antenna is configured to emit one or more beams in different directions inside a tag reading boundary, and wherein the second antenna is configured to emit one or more beams in different directions beyond the tag reading boundary. Advantageously, this allows tag reading areas to be established inside the boundary and tag reading exclusion zones to be set up outside the boundary. The zones may be switched intermittently so that, for example, in a first time period the system attempts to read in the first zone and disrupt the reading in the second zone. In a second time period, the system instead disrupts the reading in the first zone and enables reading in the second zone. This switching at a predetermined rate allows movement of RFID tags across the boundary to be tracked.

Thus, in some implementations, the RFID communication disruptor is further coupled to the first antenna, the RFID reader is further coupled to the second antenna, and the RFID system is configured to switch transmitting of the interference signal between inside and beyond the tag reading boundary at a predetermined switching rate.

In some implementations, a beam width of the one or more beams of the first antenna in a first plane is greater than a beam width in a second plane perpendicular to the first plane. For example, the beam may be wider in a horizontal direction parallel to a floor of a room or space relative to the vertical direction as in such use cases, horizontally wide read zones are more useful than vertically tall read zones.

In some implementations, the first and/or second antenna each comprise a plurality of antenna elements arranged orthogonally with respect to each other and configured to emit said one or more beams in said different directions.

As has been described above, in some cases the communication signal and/or interference signal may be steered around an area by establishing and controlling an interference pattern. Thus, in some implementations, the RFID system comprises an array of antennas, for example, comprising said first antenna and second antenna, for transmitting said communication signal and said interference signal, wherein each antenna configured to emit a plurality of beams in different directions, wherein the beams of each pair of adjacent antennas are directed towards one another so that the beams overlap.

In some implementations, the RFID reader is connected to at least two of the antennas such that at least one pair of adjacent antennas transmits simultaneously such that the overlapping beams interfere with one another to create an interference pattern, and the RFID reader is configured to control at least one of the phase and the frequency of one of the interfering beams with respect to the other to move the interference pattern to read one or more RFID tags within the moving interference pattern.

In some implementations, the RFID communication disruptor is connected to at least two of the antennas such that at least one pair of adjacent antennas transmits simultaneously such that the overlapping beams interfere with one another to create an interference pattern, and the RFID communication disruptor is configured to control at least one of the phase and the frequency of one of the interfering beams with respect to the other to move the interference pattern to prevent the RFID reader from reading the RFID tag within the moving interference pattern.

In another aspect there is provided a method for reading at least one RFID tag, the method comprising: transmitting a communication signal that is according to an RFID protocol, the communication signal for communication from an RFID reader to the RFID tag or from the RFID tag to the RFID reader, the RFID reader coupled to a first antenna; and interfering with the communication signal by transmitting an interference signal from an RFID communication disruptor coupled to a second antenna to prevent the RFID reader from reading the RFID tag.

BRIEF DESCRIPTION OF THE DRAWINGS

FIG. 3b shows a wide area array comprising groups of antennas as displayed in FIG. 3a.

FIG. 4b shows a wide area array comprising groups of antennas as displayed in FIG. 4a.

DETAILED DESCRIPTION OF THE DRAWINGS

Figure 1:
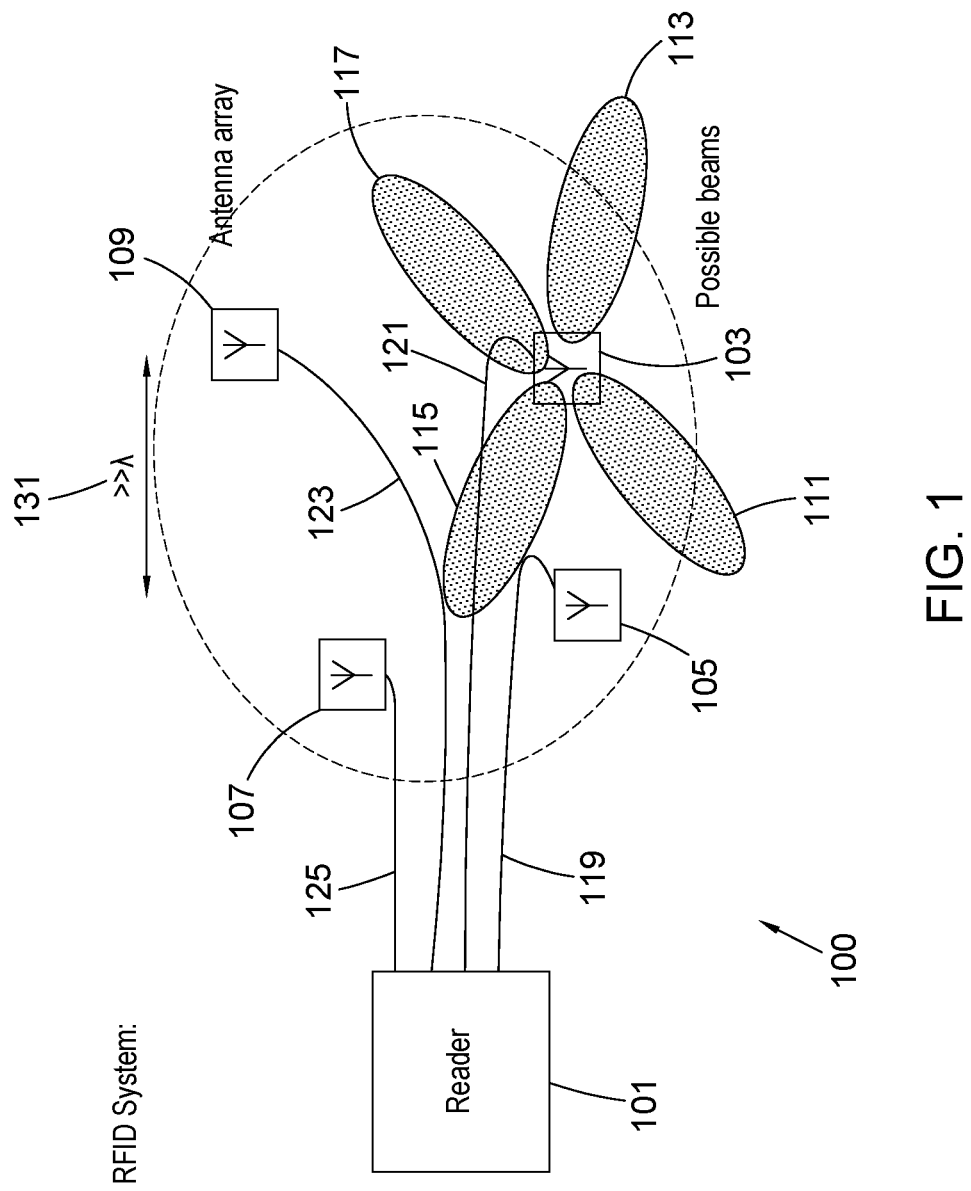
FIG. 1 shows an RFID system 100 for reading at least one RFID tag.

FIG. 1 shows an RFID system 100 for reading at least one RFID tag. The RFID system 100 comprises an array of antennas 103, 105, 107, 109. Each of the antennas 103, 105, 107, 109 are configured to emit a plurality of beams in different directions. This is exemplified by the beams 111, 113, 115, 117 emitted by the antenna 103. The beams of each pair of adjacent antennas can be directed towards one another so that the beams overlap. This is shown in more detail in FIG. 2. The arrays may be ceiling-mounted, this is shown in more detail in FIG. 8. The RFID system 100 comprises a RFID reader 101 connected to each of the antennas 103, 105, 107, 109 via the connections 119, 121, 123, 125. The RFID reader 101 is configured to control at least one pair of adjacent antennas (e.g. 105 and 103) to transmit simultaneously such that the overlapping beams interfere with one another to create an interference pattern. The RFID reader 101 may be configured to control at least one of the phase and the frequency of one of the interfering beams with respect to the other to move the interference pattern to read one or more RFID tags within the moving interference pattern. As can be seen from the spacing 131, the spacing between antennas in an antenna array (e.g. antennas 109 and 107) is much larger than a wavelength of a beam emitted by an antenna.

Figure 2:
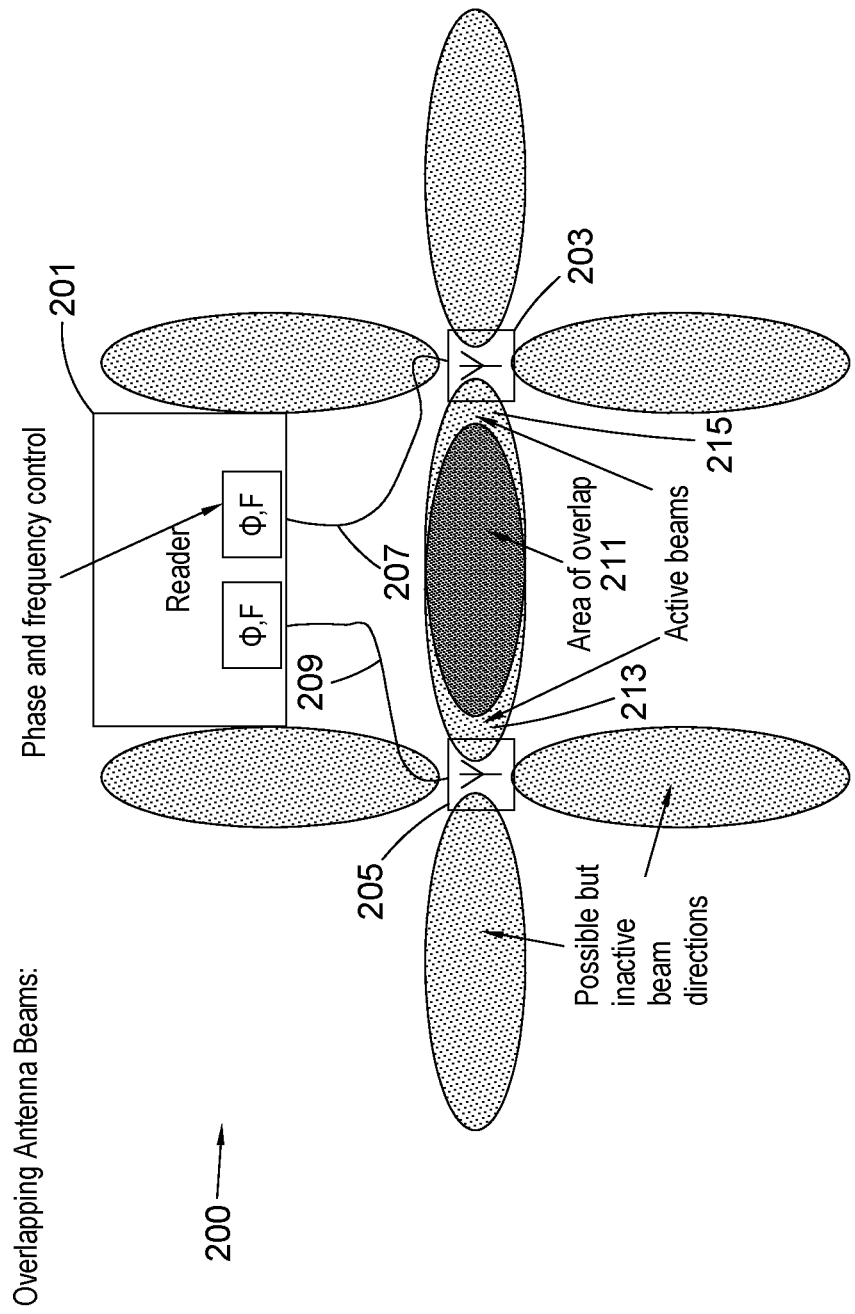
FIG. 2 shows an RFID system 200.

FIG. 2 shows an RFID system 200. The RFID system 200 comprises two antennas, 203 and 205. The two antennas 205 and 203 are connected via connections 209 and 207 to a RFID reader 201. The RFID reader 201 is configured to control the phase and frequency of the beams emitted by antennas 205 and 203. The RFID system 200 is configured to create a region of interference 211. For example the region of interference 211 is created by a superposition of beam 213 (emitted by the antenna 205) and beam 215 (emitted by the antenna 203). Both constructive and destructive interference will occur at different locations within the region of interference 211. Adjusting the relative phase of the transmissions from antennas 213 and 215 will alter the locations of destructive and constructive interference. Adjusting e.g. the phase of each beam alters the inference pattern within the area of overlap to 'dither' the locations of the constructive and destructive interference, with the aim that over time all locations should achieve constructive interference. As the chance of a RFID tag responding to an emitted beam generally increases with signal strength of the emitted (reader) beam, the area of constructive interference 211 means that RFID tags in that region (i.e. region 211) are more likely to respond to the signal. The direction and phase of the beams (e.g. 213, 215) are controlled by the reader 201 to direct regions of interferences toward an area containing RFID tags to be read. Therefore, a system 200 can cover a large proportion of the area below the antennas 205 and 203.

The layout and geometry of the antennas 205 and 203 of the array is such that these regions of controlled interference 211 form a substantially continuous region of coverage.

Figure 3A:
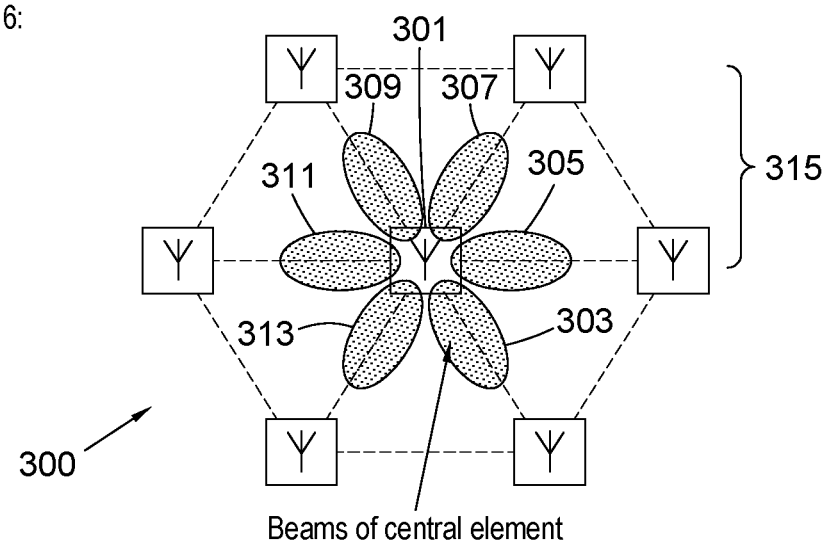
FIG. 3a shows a group of antennas 300 with a central antenna configured to emit 6 beams in 6 different radial directions.

FIG. 3a shows a group of antennas 300. Each antenna of the group of antennas 300 is configured to emit n beams in n different radial directions. The group of antennas 300 comprises a central antenna 301 configured to emit 6 beams (303, 305, 307, 309, 311, 313) in 6 different radial directions. The array (i.e. the group of antennas) 300 is defined by nodes at which the antennas are located. The different directions may correspond to lines between nodes of the array 300. This allows for different arrangements of antennas.

Figure 3B:
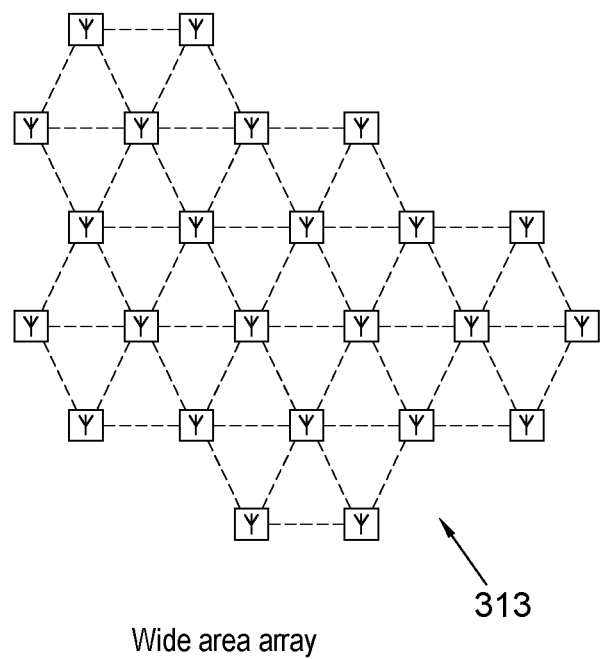

The group of antennas 300 is an embodiment where n=6 and forms a triangular grid 315. This can be seen in FIG. 3b which shows a wide area array 313 comprising groups of antennas as displayed in FIG. 3a.

Figure 4A:
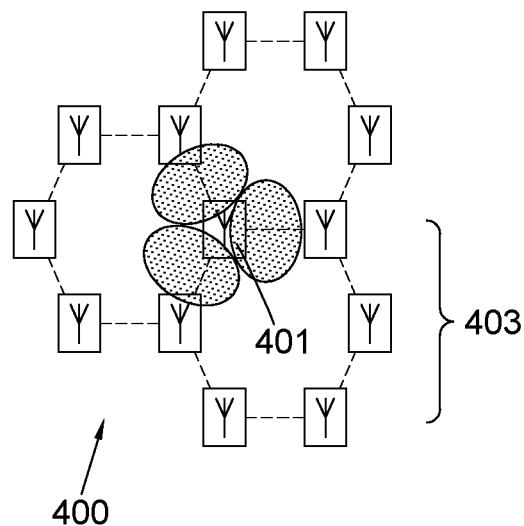
FIG. 4a shows a group of antennas with a central antenna configured to emit 3 beams in 3 different radial directions.
Figure 4B:
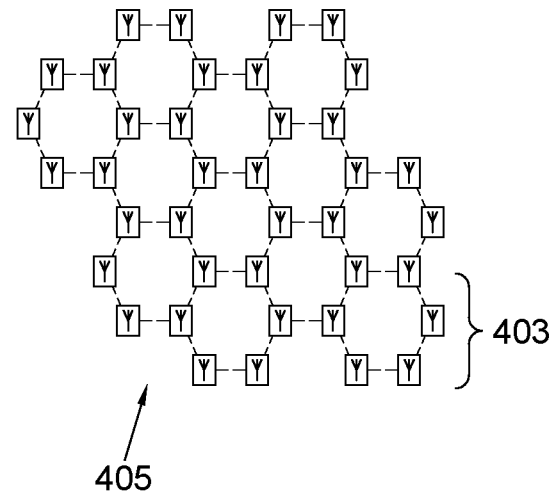

FIG. 4a shows a group of antennas 400 having a central antenna 401 configured to emit 3 beams in 3 different radial directions. For the group of antennas 400, n=3 and the antennas forms a hexagonal grid 403. The arrangement and geometry of the antennas 400 can be tailored, for example, to specific requirements of the desired coverage area, and/or to the shape, size and type of RFID tags likely to be within the area. FIG. 4b shows a wide area array 405 comprising groups of antennas as displayed in FIG. 4a. FIG. 4b displays the hexagonal arrangement 403.

Figure 5:
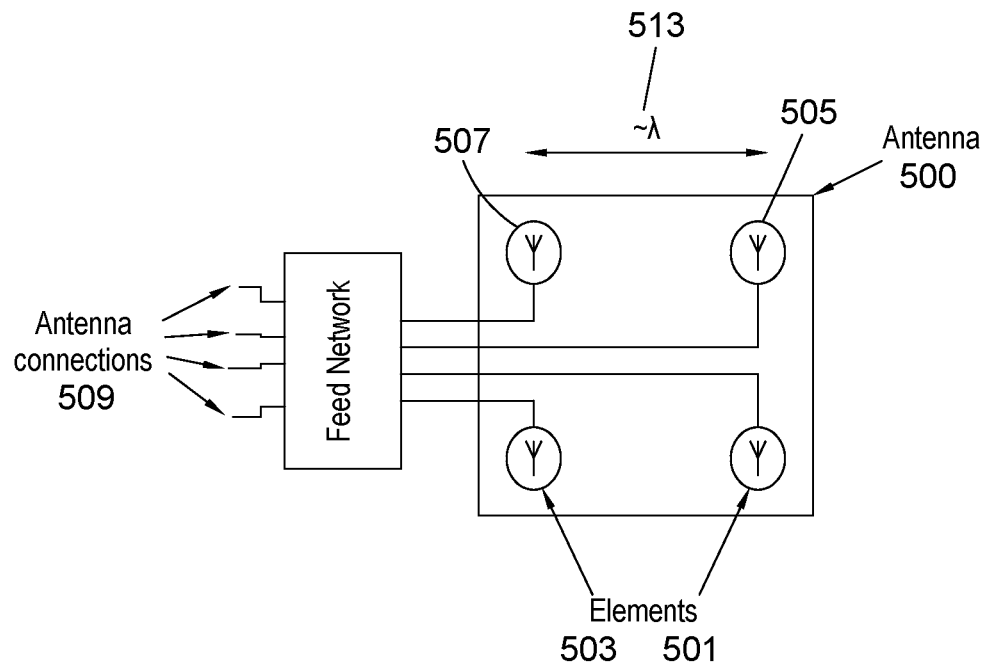
FIG. 5 shows an antenna 500 comprising multiple antennas elements 501, 503, 505, 507.

FIG. 5 shows an antenna 500 comprising multiple antennas elements 501, 503, 505, 507. FIG. 5 shows a set of connections 509 corresponding to the antenna elements 501, 503, 505, 507 (one connection for each beam direction). The direction of a beam produced by one of the multiple antenna connections 509 is dependent upon at least one of: a spacing between two antenna elements of said antenna 500; an electronic configuration of said antenna 500 and feed network; a shape of said antenna elements 501, 503, 505, 507. The connections 509 are configured to be transmitting and/or receiving connections. This antenna 500 is configured to optimally cover the area being targeted. The single antenna 500 emits multiple beams and thus facilitate providing coverage in multiple directions from the antenna 500. This can reduce areas where there is low coverage.

In implementations each antenna connection passes signals to some or all of the antenna elements via the feed network. A configuration of the feed network may determine the phases and amplitudes of each element corresponding to a particular antenna connection, which together with the geometry and properties of the elements determines the beam direction and shape.

By having each connection of the group of connections 509 drive a beam in a given direction, each beam direction can be adjusted independently rather than controlling all of the multiple beams emitted from the antenna 500 in the same manner. Therefore the antenna 500 is configured to allow one port that is transmitting whilst another port receives a signal. Thus antenna 500 is configured to transmit signals into one area of coverage and to receive signals from RFID tags in another direction.

The antenna 500 is also configured to emit multiple beams at a given (simultaneous) time, rather than a reader (not shown) triggering the beams of antenna 500 to be emitted at separate times. This facilitates continuous coverage of an area associated with the antenna 500.

As can be seen by the spacing 513, the spacing between antenna elements in an antenna is approximately equal to a wavelength of the beam emitted by the antenna element.

Figure 6:
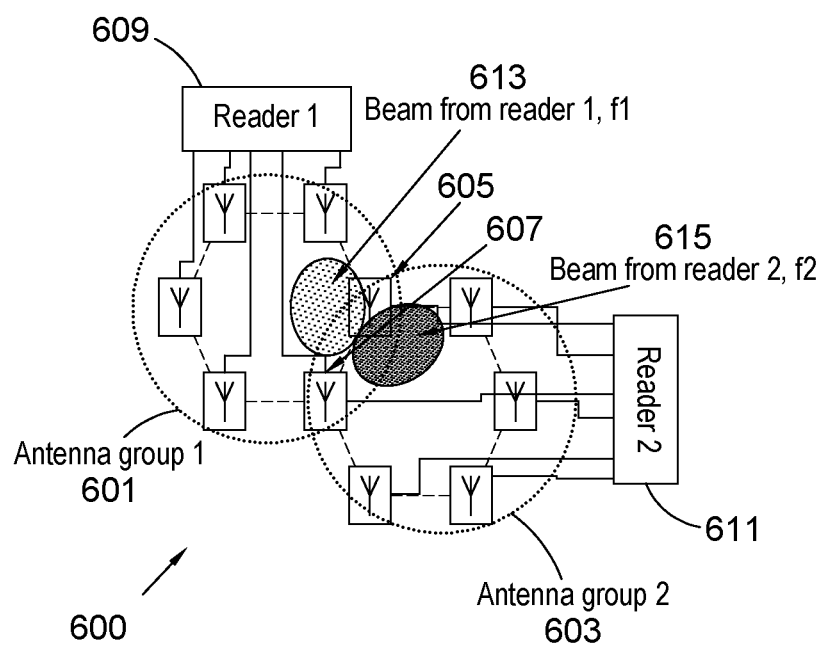
FIG. 6 shows an RFID system 600 comprising two adjacent groups of antennas (601, 603) having two shared antennas 605, 607.

FIG. 6 shows an RFID system 600 comprising two adjacent groups of antennas (601, 603) having two shared antennas 605, 607. Each group of antennas 601, 603 has an associated RFID reader 609, 611 respectively. The RFID reader 609 operates at a different frequency to the RFID reader 611. The adjacent groups 601, 603 comprise two shared antennas (605, 607). The system 600 is configured to control the RFID readers 609, 611 such that a shared antenna emits beams of two different frequencies in two different respective directions, one for each group. For example, FIG. 6 shows the RFID reader 609 controlling the shared antenna 607 to emit a beam 613 at a first frequency in the direction of the antenna group 601. For example, FIG. 6 further shows the RFID reader 611 controlling the shared antenna 607 to emit a beam 615 at a second frequency in the direction of the antenna group 603.

Figure 7:
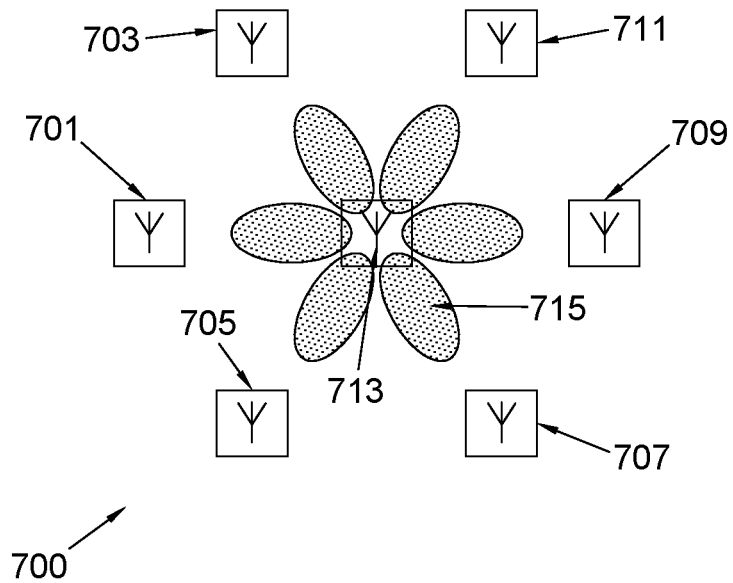
FIG. 7 shows an RFID system comprising a group of antennas 700.

FIG. 7 shows an RFID system comprising a group of antennas 700. The group of antennas comprises multiple boundary antennas (701, 703, 705, 707, 709, 711) and a central antenna 713. The possible beams (e.g. 715) of the central antenna 713 are directed towards each boundary antenna. One or more of the boundary antennas (701, 703, 705, 707, 709, 711) may be shared between the further groups of antennas. The group of antennas 700 are configured to operate at a different frequency to an adjacent group. This helps to reduce unintentional interference between different groups of antennas. Although within the group 700 there are regions of intentional interference (not shown), it may be disadvantageous to have inference between/across groups. The beams emitted from the antennas of the group 700 will point into and/or towards the group with which the beam is associated. Thus, the group 700 can provide substantially continuous coverage within the group 700 and minimal coverage outside of the group. This minimising the effect of interference across groups. Furthermore, and in reference to FIG. 6, because multiple beams associated with multiple groups are emitted from a single antenna (see beams 613, 615 emitted from antenna 607), the region of coverage generally covered by the group 601 borders the coverage of the adjacent group 603. Therefore, a system with multiple groups comprising antennas associated with multiple groups (such as system 600), it is possible to have large continuous areas of coverage.

Further referring to FIG. 6, because the antenna 607 is associated with group 601 and group 603, the groups 601 and 603 can be more closely spaced together than if separate antennas were used for the separate groups 601 and 603.

In the system 600, the RFID readers are synchronized in frequency and/or transmit timing. In the system 600 there is a possibility that adjacent readers 609 and 611, even when operating on different frequencies, will cause reader-reader interference at the tag owing to the lack of frequency selectivity in low cost passive tags. Such interference may result in tags not being able to correctly demodulate reader commands. Therefore the system 600 is configured to synchronise the reader signal (modulation, and optionally protocol) across readers 609 and 611 to suppress this problem. This can be achieved with synchronisation at the relatively low reader modulation rate, which is typically 100's kHz to 1 MHz.

In system 600, frequency synchronization is used to inhibit adjacent readers 609 and 611 from operating on the same frequency, which can cause interference at the reader's receiver from the adjacent reader transmitter if the modulation and protocol are not synchronised. This can arise from the signal (modulation) from one reader corrupting tag signals from another reader. System 600 is further configured to control the operating frequencies of the adjacent readers 609 and 611 such that their frequencies are well enough separated that the beat (difference) frequency is different, e.g. substantially different, from the modulation frequency. In an alternative arrangement, readers 609, 611 may use a listen before for talk (LBT) scheme to avoid selecting the same channel.

Figure 8:
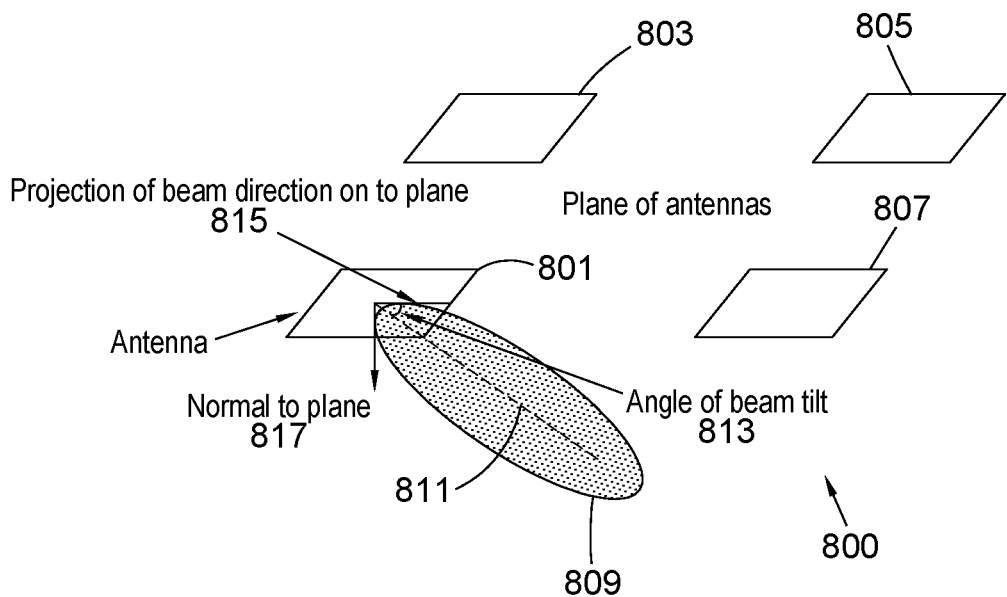
FIG. 8 shows multiple antennas 800 configured to be ceiling mounted.

FIG. 8 shows multiple antennas 800 configured to be ceiling mounted. Each antenna (801, 803, 805, 807) is configured to emit a plurality of beams in different lateral directions, each directed at an angle away from a plane defined by the array of antennas. For example, FIG. 8 shows that antenna (801) is configured to emit a beam 809 in a lateral direction. The beam 809 is directed at an angle 813 away from a plane defined by the array of antennas. The component of the projection of the beam in a direction on to the plane is shown by the line 815, whilst the component of the projection of the beam in a direction normal to the plane is shown by line 817. The lateral direction 811 provides overlapping regions of coverage with other antennas (e.g. between antennas 801 and 807). The beam 809 being directed away from (i.e. normal to the plane, i.e. in direction 817) the plane has an advantage that when the antennas (801, 803, 805, 807) are ceiling mounted, the beams travel downwards (i.e. in the direction of 817) in the direction of RFID tags positioned under the ceiling.

In some implementations of the system, the RFID reader is configured to dither a relative phase of the overlapping beams. The dithering of the relative phase can facilitate the creation of regions of constructive interference.

Figure 9:
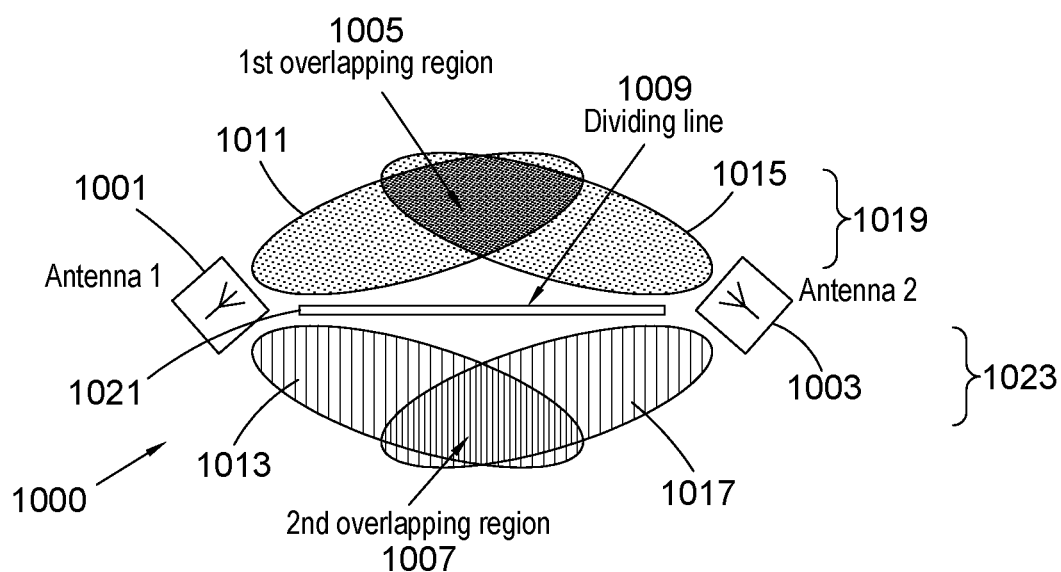
FIG. 9 shows a RFID system 1000 comprising two antennas 1001, 1003 configured to generate an overlapping region (1005, 1007) on either side of a dividing line 1009.

FIG. 9 shows a RFID system 1000 comprising two antennas 1001, 1003 configured to generate an overlapping region (1005, 1007) on either side of a dividing line 1009. In the system 1000, a RFID reader (not shown) is configured to control a first antenna 1001 of the array to emit a first beam 1011 and a second beam 1013. The first beam 1011 and second beam 1013 differ in either time or frequency. The first beam 1011 and second beam 1013 differing in time is discussed with reference to FIG. 11 whilst the first beam 1011 and second beam 1013 differing in frequency is discussed with reference to FIG. 12. With reference to FIG. 9, the first beam 1011 generates a first overlapping region 1005 with a beam 1015 emitted from the second antenna 1003 of the array. The second beam 1013 generates a second overlapping region 1007 with a beam 1017 emitted from the second antenna 1003. The first overlapping region 1005 is on a first side 1019 of the dividing line 1009 joining the two antennas 1001 and 1003. The second overlapping region 1007 is on a second side 1023 of the dividing line 1009. This facilitates monitoring of a portal such as a door through which the RFID tags may pass.

Figure 10:
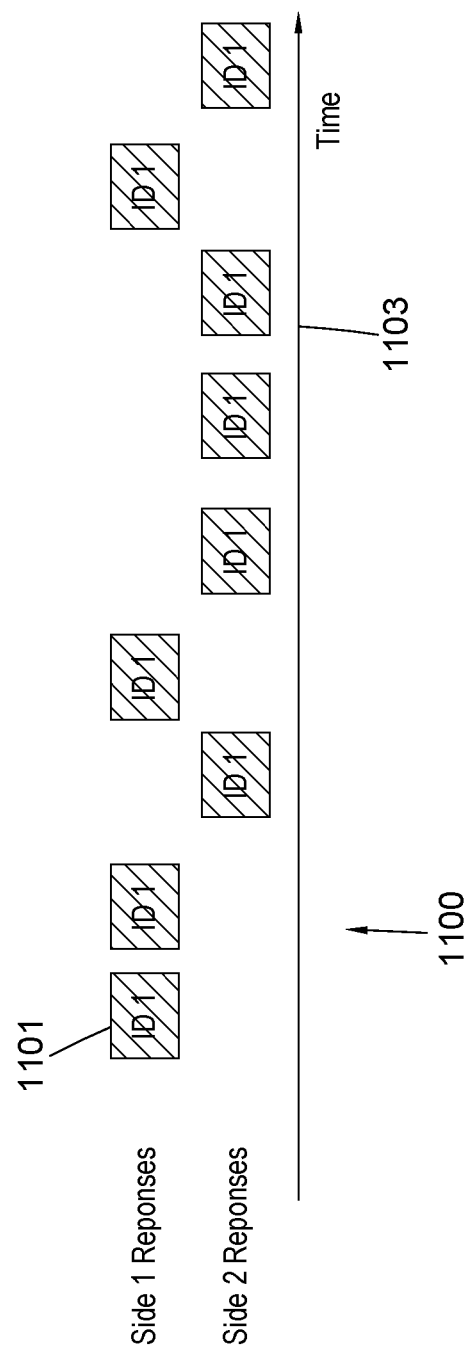
FIG. 10 shows a schematic diagram 1100 displaying how the system 1000 is configured to determine movement of an identified tag 1101 towards, or away, or across the dividing line 1009.

FIG. 10 shows a schematic diagram 1100 displaying how the system 1000 is configured to determine movement of an identified tag 1101 towards, or away, or across the dividing line 1009. Time is represented by the horizontal arrow 1103. The RFID system 1000 is further configured to count over a sliding time interval, for an identified tag 1101, a number of tag reads, and/or read rate, on the first side of the line 1019 and on the second side of the line 1023, and to determine, from a difference between the number of tag reads or read rate on each side of the line, probable movement of the identified tag towards, away or across the dividing line.

Figure 11:
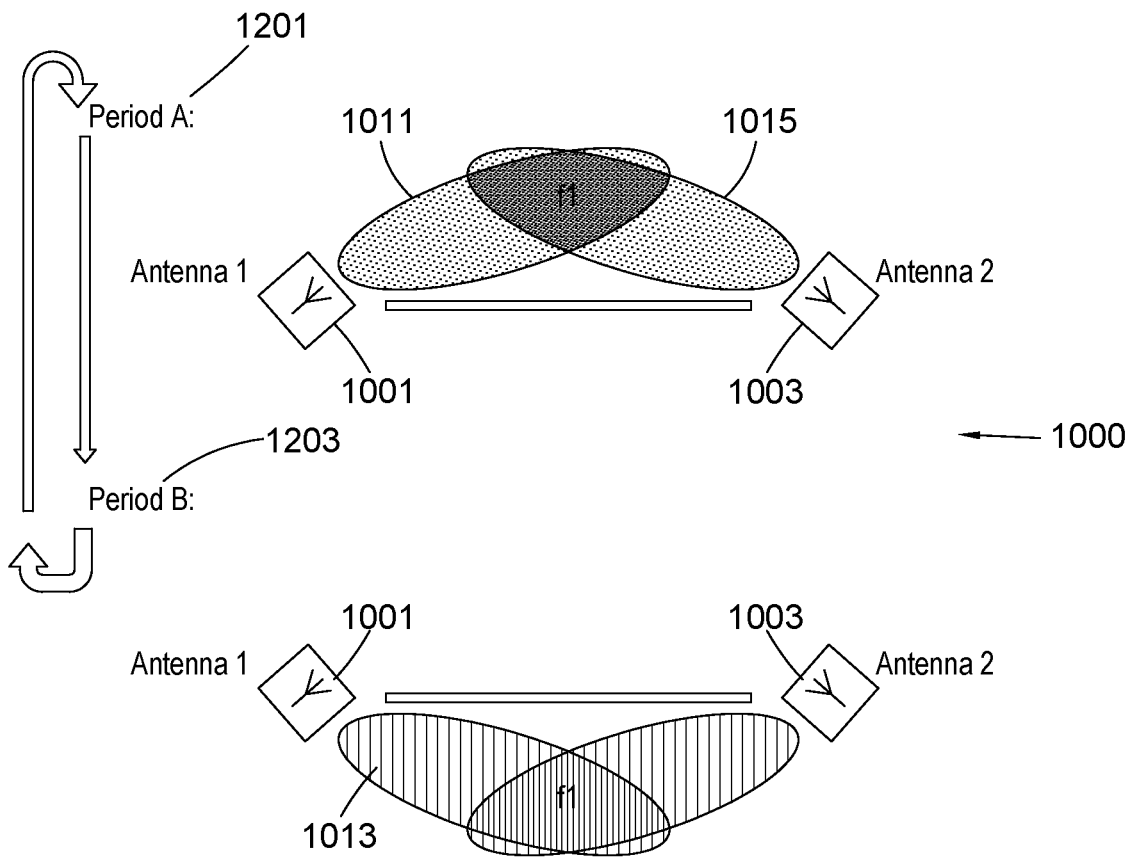
FIG. 11 shows an embodiment of the system 1000 comprising two antennas configured to generate an overlapping region on either side of a dividing line at a first time 'Period A' 1201 and a second time 'Period B' 1203.

FIG. 11 shows an embodiment of the system 1000 comprising two antennas configured to generate an overlapping region on either side of a dividing line at a first time 'Period A' 1201 and a second time 'Period B' 1203. In the system 1000 shown in FIG. 11, a transmission of the first beam 1011 and second beam 1013 occurs at different (non-overlapping) times 1201 and 1203. In other words, the emission of the beams 1011 and 1013 from the antenna 1001, alternates. This facilitates the system 1000 determining which beam emission triggered a given RFID tag to respond. This advantage may also be provided by the antenna 1001 emitting beams 1011 and 1013 having different frequencies. Creating overlapping regions of the beams advantageously provides for stronger signal coverage. Furthermore, two narrow overlapping beams (such as beams 1011 and 1015) define a narrower area of coverage than a single beam of the same area. This is used in the system 1000 to more accurately determine the location of an RFID tag than may be possible with a single beam.

Figure 12:
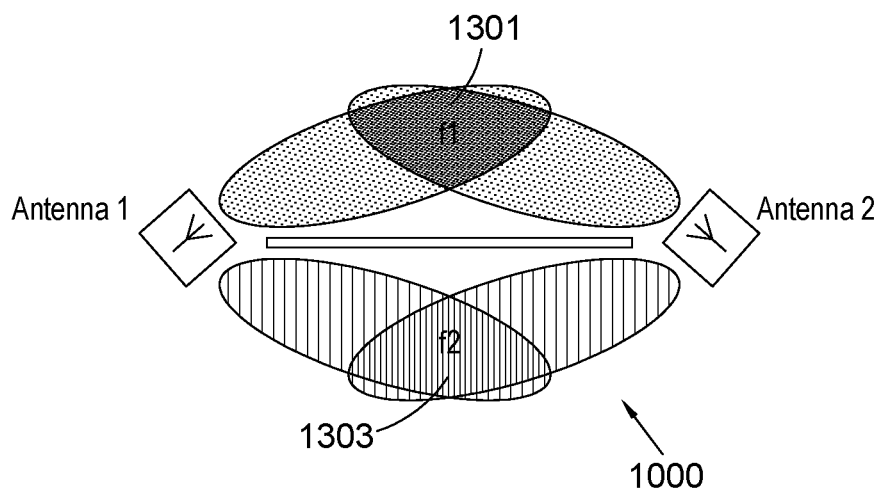
FIG. 12 shows an embodiment of the system 1000 comprising two antennas configured to configured to generate a first overlapping region 1301 on a first side of a dividing line at a first frequency f1, and a second overlapping region 1303 on a second side of a dividing line at a second frequency f2.

FIG. 12 shows an embodiment of the system 1000 comprising two antennas configured to configured to generate a first overlapping region 1301 on a first side of a dividing line at a first frequency f1, and a second overlapping region 1303 on a second side of a dividing line at a second frequency f2.

The embodiments of FIG. 11 and FIG. 12 may be alternatives. The embodiments of FIG. 11 and FIG. 12 may be combined so as to produce two overlapping regions, each region on either side of a dividing line, where the two overlapping regions differ in frequency and differ in time.

Embodiments of the system 1000 can be installed over a doorway, which can define a boundary to be crossed. Embodiments of the system 1000 can probabilistically determine whether an RFID tag is on one side of the doorway or another, and if the tag has moved from one side to another.

As described, the system 1000 comprises two antennas of an array of antennas that define a dividing line 1009. The RFID system 1000 may be configured to drive the antennas so that opposite sides of the dividing line are either i) alternately illuminated by the interfering beams as displayed in FIG. 11 or ii) illuminated by interfering beams of different frequencies as displayed in FIG. 12. The RFID system 1000 is configured to determine movement of a tag across the dividing line from respectively either i) a difference in read rate of the tag during the times of alternate illumination or ii) a difference in read rate of the tag at the different frequencies, as the tag moves from one side of the dividing line to the other.

In an example use a plurality of beams is emitted from each antenna of an array of antennas as previously described, in different directions. The beams of each pair of adjacent antennas are directed towards one another so that the beams overlap. An interference pattern is created using overlapping beams by transmitting from one or more pairs of adjacent antennas simultaneously. The phase and/or frequency of one of the interfering beams is varied with respect to the other to move the interference pattern, and the RFID tag(s) are read within the moving interference pattern.

There is further described an RFID or radio system for reading one or more RFID tags or radio sensors. The system comprises an antenna comprising an array of antenna elements. The system may comprises a feed network configured to produce multiple discrete beams from the antenna elements, having multiple ports. Each port may be configured to produce a beam. The system comprises one or more RFID reader units or radio systems, each e.g. connected to a port of said feed network. The one or more RFID reader units or radio systems are operated such that each beam of the antenna is simultaneously modulated with substantially different signals and/or has a different carrier frequency.

Figure 13A:
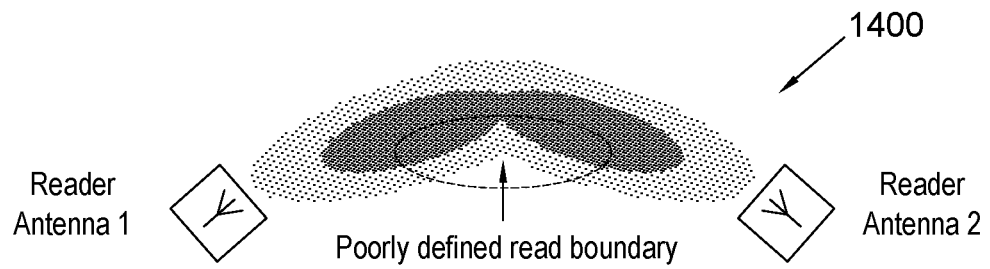
FIG. 13a shows an RFID system 1400 without a suppressor antenna.
Figure 13B:
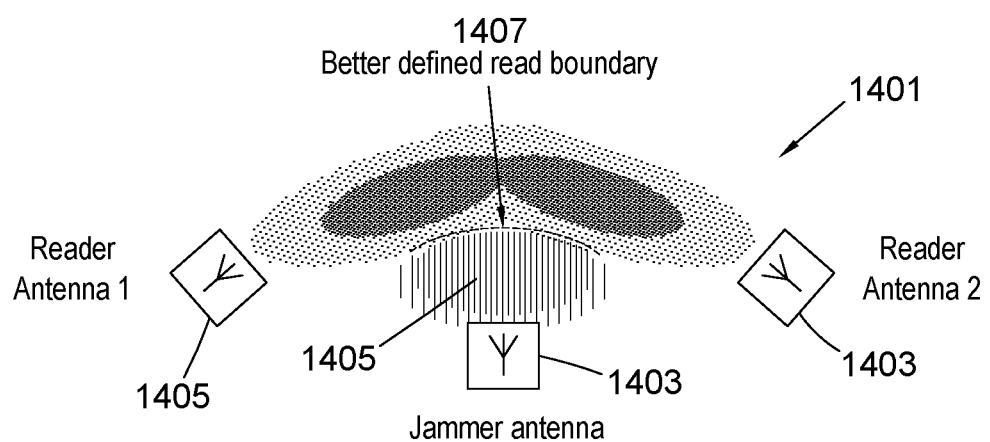
FIG. 13b shows an RFID system 1401 comprising a suppressor antenna 1403.

FIG. 13a shows an RFID system 1400 without a suppressor antenna. FIG. 13b shows an RFID system 1401 comprising a suppressor antenna 1403. The RFID system 1401 can restrict the area of coverage of a particular antenna (e.g. antennas 1403, 1405) by transmitting a suppressing signal from suppressing antenna 1403 such that the tags within the suppressing area 1405 are unable to respond to the reader with an identifier such as an EPC (Electronic Product Code), even if sufficient field strength exists to activate the tag. This is advantageous where it is desired to create a sharp boundary (e.g. 'better defined read boundary' 1407) between areas where tags are and are not read. The system 1400 is thus configured to transmit a suppressing signal towards an area of tag-reading coverage of one or more of the antennas 1405, 1403 to define a boundary of the area of tag-reading coverage.

Figure 14:
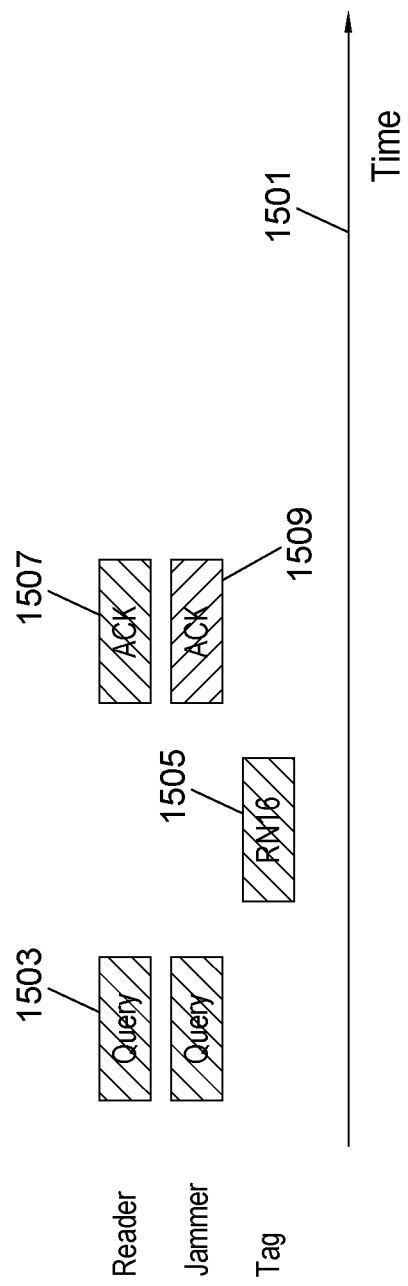
FIG. 14 shows a schematic diagram of a method of suppressing comprising transmitting noise and/or transmitting a signal according to a protocol of the RFID tag which includes an error check.

FIG. 14 shows a schematic diagram of a method of suppressing comprising transmitting noise and/or transmitting a signal according to a protocol of the RFID tag which includes an error check, wherein the suppressing signal comprises data which is configured to fail the error check. Such a method may comprise of emitting a suppressing signal comprising data which is configured to fail an error check. The suppressing may comprise transmitting noise and/or may comprise transmitting a signal according to a protocol of the RFID tag which includes an error check, wherein the suppressing signal comprises data which is configured to fail the error check.

In FIG. 14, the horizontal arrow 1501 represents time. At a first time a reader and a suppressor transmit a same, well-formed query command 1503. At a later time, a tag response to the queries with a random 16 bit handle (RN16) 1505. Following this, the reader responds with an acknowledgement 1507 containing the same RN16 that was emitted by the tag, the suppressor responds with an acknowledgment 1509 that is known to be an incorrect RN16. Therefore, the tag never transmits an EPC (96 bit identifier). Suppressing can be achieved e.g. using a carrier modulated with frequency band limited noise or a pseudo random modulated signal similar to the reader to tag communication, or can be achieved by using signals which are compliant with the protocol, but purposefully inserting errors into acknowledgement packets.

Thus a method of reading an RFID tag may comprise emitting a reading signal from a first antenna and emitting a suppressing signal from a second, suppressor antenna. In some implementations the beams of the reading and suppressing signals are arranged to overlap sufficiently to cause a sharp boundary between where tags are and are not able to be read. One or more of the antennas may be part of an antenna array.

A RFID system for performing the method e.g. of FIG. 14 comprises: an RFID reader coupled to a first antenna for reading an RFID tag; and an RFID signal suppressor coupled to a second antenna and configured to suppress the RFID reader from reading the RFID tag. The RFID signal suppressor coupled to the second antenna may be configured to suppress the RFID reader from reading the RFID tag when the RFID tag is beyond a tag reading boundary of the RFID reader, e.g. by directing the second antenna and/or adjusting a strength of the suppressing signal.

Figure 15:
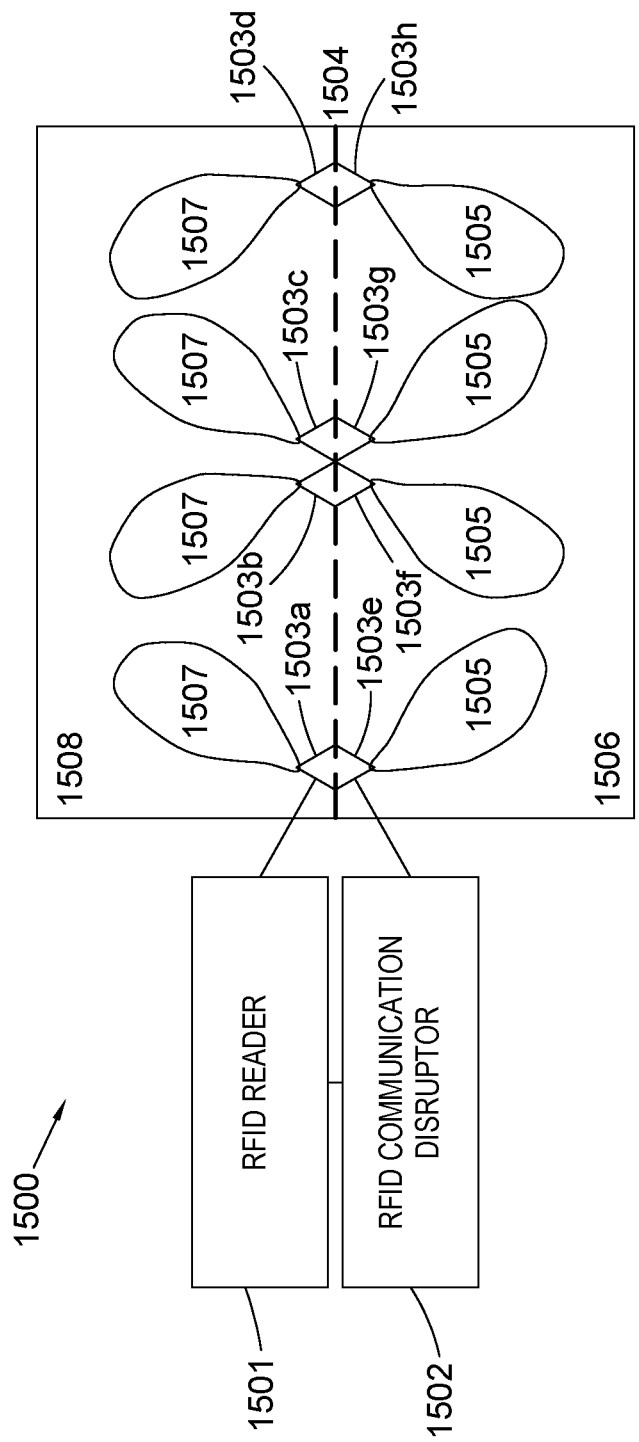
FIG. 15 shows an RFID system according to the present disclosure comprising an RFID reader and an RFID communication disruptor.

FIG. 15 shows an RFID system 1500 comprising for reading at least one RFID tag that may use the arrangements of any of the systems of any one or more of FIGS. 1-14. In FIG. 15, the system 1500 comprises an RFID reader 1501 and an RFID communication disruptor 1502 coupled to an antenna array comprising a plurality of antennas 1503a-h. The antennas are arranged along a boundary 1504 in a space such that an interference signal 1505 from the RFID communication disruptor 1502 is transmitted on one side 1506 of the boundary 1504 to prevent reading of any RFID tags on that side 1506. On the other side 1508 of the boundary 1504, the communication signal 1507 from the RFID reader 1501 is not disrupted so the RFID reader is able to read any RFID tags present on that side 1508.

The RFID reader 1501 and communication disruptor 1502 are coupled to each other, for example to allow the communication disruptor generate the interference signal using communication signal information from the RFID reader 1501.

As with the other embodiments described herein, the RFID reader 1501 is configured to control at least one pair of adjacent antennas (e.g. 1503a and 1503b) to transmit simultaneously such that the overlapping beams interfere with one another to create an interference pattern. The RFID reader 1501 may be configured to control at least one of the phase and the frequency of one of the interfering beams with respect to the other to move the interference pattern to read one or more RFID tags within the moving interference pattern.

In a similar manner, the RFID communication disruptor is configured to control at least another pair of adjacent antennas (e.g. 1503e and 1503f) to transmit simultaneously such that the overlapping beams interfere with one another to create an interference pattern. The RFID communication disruptor 1502 may be configured to control at least one of the phase and the frequency of the one of the interfering beams with respect to the other to move the interference pattern to prevent one or more RFID tags from being read within the moving interference pattern.

As is also described in connection with FIGS. 13a and 13b, an advantage of using an interference or suppressing signal rather than solely relying on the directionality of the transmitted beams is that it allows a sharp read boundary 1504 to be provided because, in the small number of cases where the RFID reader incorrectly reads tags on the disrupted side 1506 of the boundary, the RFID communication disruptor ensures that the RFID protocol messages are corrupted and thus do not result in a valid read.

The RFID system of FIG. 15 may also be used in a similar manner to that described with reference to FIG. 11. In particular, the RFID reader 1501 and communication disruptor 1502 may switch at a predetermined rate on which side of the boundary 1504 they transmit their respective signals to track movement of tags across the boundary. If a tag is detected on one side of the boundary at a first time, but on another side of the boundary at a second time, it indicates the tagged has moved across the boundary.

Different ways of corrupting the RFID protocol messages will now be described with reference to FIG. 16.

Figure 16:
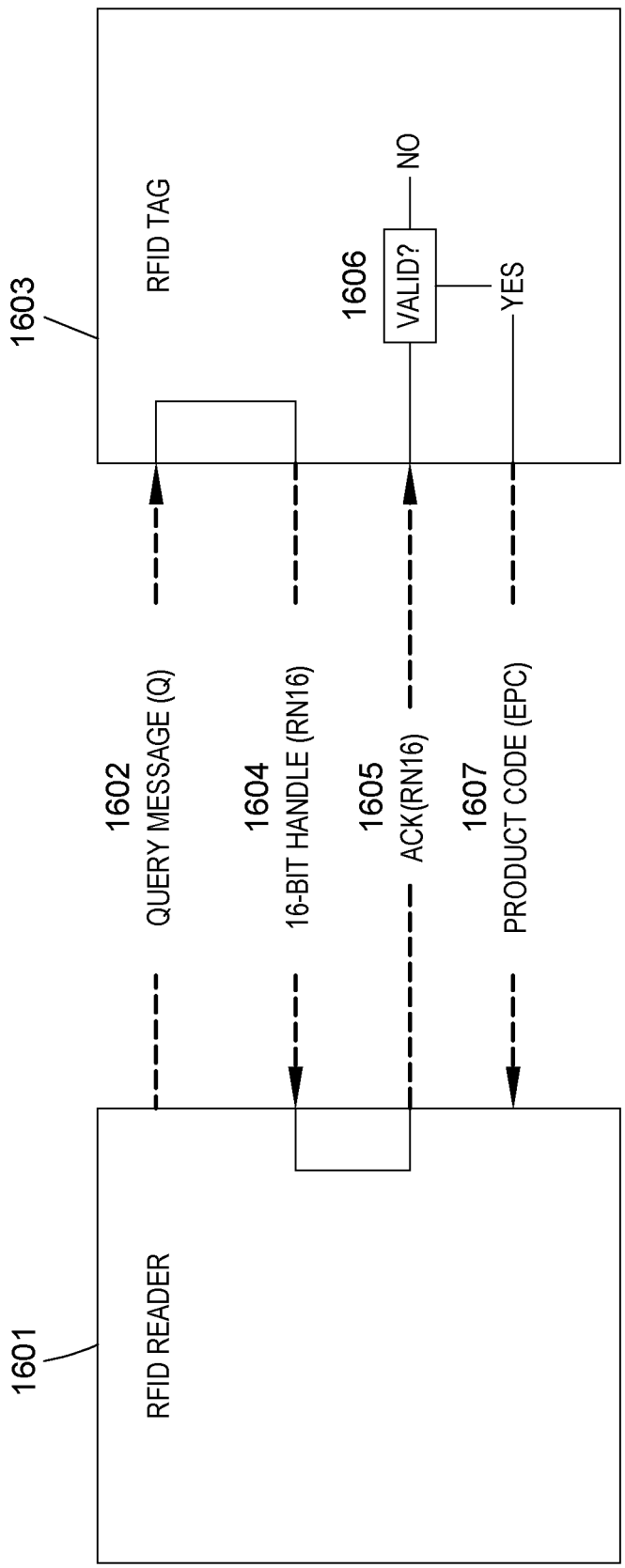
FIG. 16 illustrates steps of an RFID protocol according to the present disclosure.

FIG. 16 illustrates steps of an example RFID protocol according to the present disclosure, for example, a EPC-global Class 1 Generation 2 (ISO 18000-6C) protocol. The RFID reader 1601 transmits 1602 a query message (Q) which is received at an RFID tag 1603.

The RFID tag 1603 responds 1604 by transmitting a 16-bit handle message (RN16) which is received by the RFID reader 1601. The RFID reader 1601 acknowledges 1605 the received RN16 message by transmitting 1605 the RN16 back to the tag as an acknowledgment message ACK(RN16). The tag 1603 performs an error check by determining 1606 if the received ACK(RN16) is valid i.e. whether or not the number the same as the originally transmitted RN16. If the received RN16 is valid, the tag 1603 transmits 1607 the electronic product code (EPC) which is then received and read by the reader 1601.

Each message is sent from the RFID reader 1601 to the tag 1603 or from the tag 1603 to the reader 1601 is an opportunity for the communication disruptor to prevent the tag 1603 from being correctly read by the reader 1601.

For example, the communication disruptor may cause one or more bits of the query message Q to be erroneously detected by the tag 1603. Thus, when the message is decoded, it is not a valid query message and the tag does not return an RN16 message. Additionally or alternatively, the communication disruptor may cause one or more bits of the RN16 message to be erroneously detected by the reader 1601. Thus, when the RFID reader re-transmits that number as an ACK(RN16) message and the tag 1603 performs an error check 1606, the error check fails because the ACK (RN16) does not match the originally transmitted RN16.

Additionally or alternatively, the communication disruptor may cause one or more bits of the ACK(RN16) message to be erroneously detected by the tag 1603. Thus, when the tag 1603 performs the error check 1606, the error check fails because the ACK(RN16) does not match the originally transmitted RN16.

It is envisaged that disrupting all three of the Q, RN16 and ACK(RN16) messages maximizes the chances of successfully preventing the RFID reader 1601 from reading the tag 1603.

In order to cause one or more bits of the Q, RN16 and/or ACK(RN16) messages to be erroneously detected by the reader or tag, the communication disruptor transmits an interference signal which interferes with the communication signals according to the RFID protocol at the reader or at the tag.

In the example of FIG. 15, the interference signal transmitted by the communication disruptor 1502 is a message corresponding to the RFID protocol (for example a Q, RN16 or ACK(RN16) message) but corrupted in some way. For example, the communication disruptor 1502 may comprise an interference transmitter comprising a power amplifier which may be switched on and off rapidly to cause intermittent transmitting of the signal causing only part of the message to be transmitted. When these partial signals interfere with the actual communication signals at the reader or tag one or more bits of the message in the actual communication signal will be erroneously detected. For example, the reader or tag has an amplitude demodulator comprising an envelope detector circuit configured to vary a threshold amplitude based on a rolling average amplitude of an input signal that performs envelope detection by detecting peaks of the input signal that are above the threshold amplitude. The partial signal transmitted by the communication disruptor alters the signal level at the input of the envelope detector to thereby cause the threshold to vary to prevent the envelope detector from correctly demodulating the communication signal thus causing one or more bits to be erroneously detected.

Using a corrupted signal that is otherwise according to the protocol is particularly advantageous as it allows the same hardware to be used to generate and transmit the communication signal and the interference signal without needing separate suppressing antenna or other hardware. Accordingly, this simplifies the setup and installation of the RFID system.

As described above, it is also envisaged that other methods of causing one or more bits of the messages of the communication signal to be erroneously detected may be used including, for example, introducing noise at the reader or tag by dithering a phase of the interference signal.

Many alternatives will occur to the skilled person. The invention is not limited to the described embodiments and encompasses modifications apparent to those skilled in the art lying within the scope of the claims appended hereto.

The invention claimed is:

1. An RFID system for reading at least one RFID tag, the system comprising:
   an RFID reader coupled to a first antenna for reading an RFID tag; and
   an RFID communication disruptor coupled to a second antenna and configured to disrupt a communication signal that is according to an RFID protocol, the communication signal for communication from the RFID reader to the RFID tag or from the RFID tag to the RFID reader, by transmitting an interference signal to prevent the RFID reader from reading the RFID tag,
wherein the first antenna is configured to emit one or more beams in different directions inside a tag reading boundary,
wherein the second antenna is configured to emit one or more beams in different directions beyond the tag reading boundary,
wherein the RFID communication disruptor is further coupled to the first antenna,
wherein the RFID reader is further coupled to the second antenna, and
wherein the RFID system is configured to switch transmitting of the interference signal between inside and beyond the tag reading boundary at a predetermined switching rate.

2. An RFID system as claimed in claim 1 wherein the RFID communication disruptor is configured to perform the interference with the communication signal when the RFID tag is beyond a tag reading boundary of the RFID reader.

3. An RFID system as claimed in claim 1 wherein the interference signal comprises a corrupted communication signal that is otherwise according to the RFID protocol.

4. An RFID system as claimed in claim 3, wherein the corrupted communication signal comprises a partial communication signal according to the RFID protocol.

5. An RFID system as claimed in claim 1 wherein the interference signal comprises random or white noise.

6. An RFID system as claimed in claim 1,
configured to generate the communication signal by amplitude and/or phase modulation of a message, and
configured to amplitude and/or phase modulate the interference signal such that each of the one or more bits of the message as detected is erroneously detected relative to the bit as transmitted.

7. An RFID system as claimed in claim 6, wherein said amplitude and/or phase modulation is relative to the communication signal.

8. An RFID system as claimed in claim 1 wherein the communication signal comprises a communication signal from the RFID reader to the RFID tag, the RFID tag configured as a bit detector to read a message in the communication signal.

9. An RFID system as claimed in claim 8 wherein, when the communication signal and interference signal interfere at the detector, the interference signal causes erroneous detection of one or more bits of the communication signal as detected relative to the bit as transmitted.

10. An RFID system as claimed in claim 9,
wherein the message is encoded in the communication signal using an amplitude and/or phase modulation scheme, and
wherein the RFID communication disruptor is configured to dither a phase of the interference signal to cause said erroneous detection of the one or more bits of the message as detected at the detector.

11. An RFID system as claimed in claim 10, wherein a frequency of the dithering is faster than a bit rate of the amplitude and/or phase modulation scheme to thereby apply and remove a phase shift to the interference signal within a single bit period of the scheme, and/or wherein said dithering is relative to the communication signal.

12. An RFID system of claim 9, configured to perform communication using the RFID protocol which includes an error check, and configured such that said erroneous detection of the one or more bits of the communication signal causes the message to fail the error check.

13. An RFID system as claimed in claim 1,
wherein the RFID tag has an amplitude demodulator comprising an envelope detector circuit configured to vary a threshold amplitude based on a rolling average amplitude of an input signal and to perform envelope detection by detecting peaks of the input signal that are above the threshold amplitude, and
wherein the RFID communication disruptor is configured to intermittently transmit the interference signal to alter the signal level at the input of the envelope detector to thereby cause the threshold to vary to prevent the envelope detector from correctly demodulating the communication signal.

14. An RFID system as claimed in claim 12, wherein the RFID communication disruptor comprises an interference transmitter to transmit the interference signal, the interference transmitter comprising a power amplifier to amplify a drive signal driving the interference transmitter, wherein the RFID communication disruptor is configured to switch the power amplifier on and off to cause said intermittent transmitting of the interference signal.

15. An RFID system as claimed in claim 1, wherein the RFID reader is configured to transmit the communication signal in a first polarization, and wherein the RFID communication disruptor is configured to transmit the interference signal in a second, different polarization.

16. An RFID system as claimed in claim 1, wherein the RFID reader is configured to transmit the communication signal having a first carrier wave frequency, and wherein the RFID communication disruptor is configured to transmit the interference signal having a second, different carrier wave frequency.

17. An RFID system as claimed in claim 16, wherein the RFID communication disruptor is configured to transmit the interference signal having a plurality of carrier wave frequencies, different to the first carrier wave frequency.

18. A method for reading at least one RFID tag, the method comprising:
transmitting a communication signal that is according to an RFID protocol, the communication signal for communication from an RFID reader to the RFID tag or from the RFID tag to the RFID reader, the RFID reader coupled to a first antenna; and
interfering with the communication signal by transmitting an interference signal from an RFID communication disruptor coupled to a second antenna to prevent the RFID reader from reading the RFID tag,
wherein the first antenna is configured to emit one or more beams in different directions inside a tag reading boundary,
wherein the second antenna is configured to emit one or more beams in different directions beyond the tag reading boundary,
wherein the RFID communication disruptor is further coupled to the first antenna,
wherein the RFID reader is further coupled to the second antenna, and
wherein the method further comprises switching transmitting of the interference signal between inside and beyond the tag reading boundary at a predetermined switching rate.

19. An RFID system as claimed in claim 8, wherein the message comprises an encoded random 16-bit handle generated by the RFID tag according to the RFID protocol in response to a query message from the RFID reader.

20. An RFID system as claimed in claim 19, wherein, when the communication signal and interference signal interfere at the RFID reader, the interference signal causes one or more bits of the encoded random 16-bit handle as detected to be erroneously detected, thereby causing the RFID system to send an acknowledgement message comprising an invalid random 16-bit handle.

* * * * *